Feb. 8, 1938.　　　　W. E. HAMLIN　　　　2,107,569
LOADING DEVICE
Filed Dec. 31, 1935　　　　2 Sheets-Sheet 1
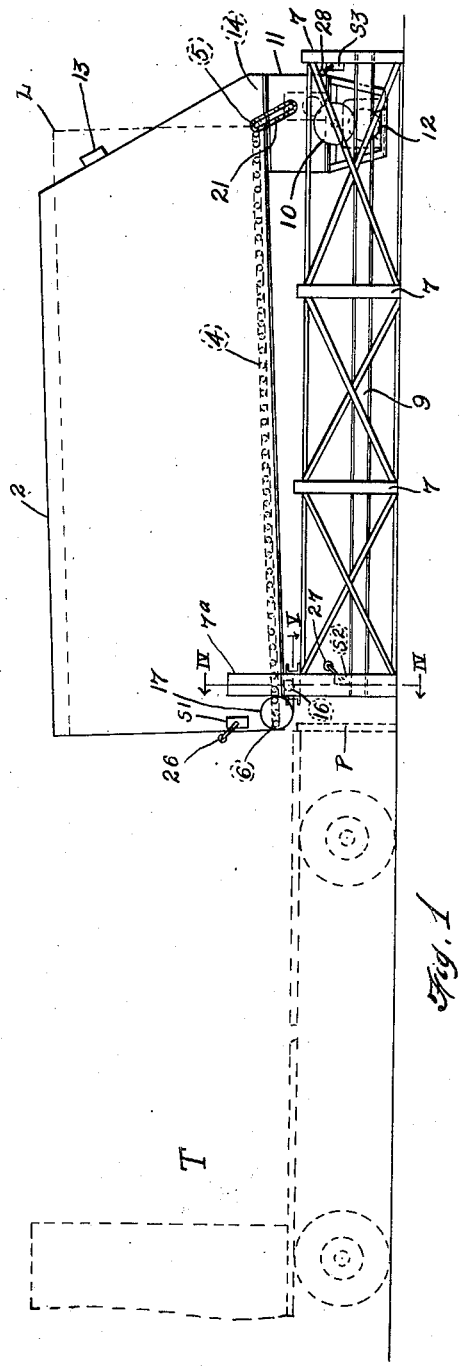
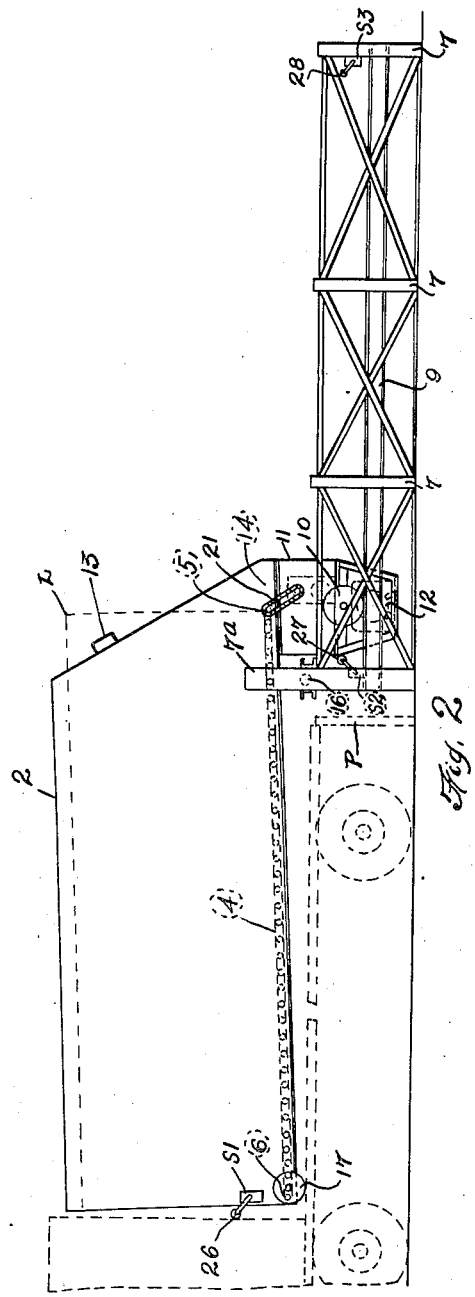
INVENTOR.
Walter E. Hamlin
BY
Ray, Oberlin & Ray
ATTORNEYS.

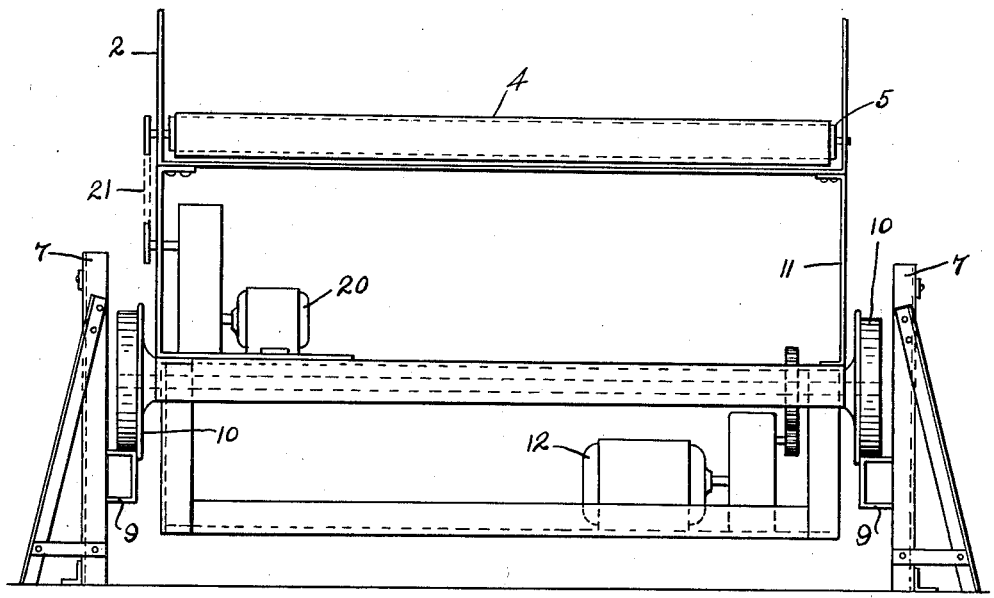
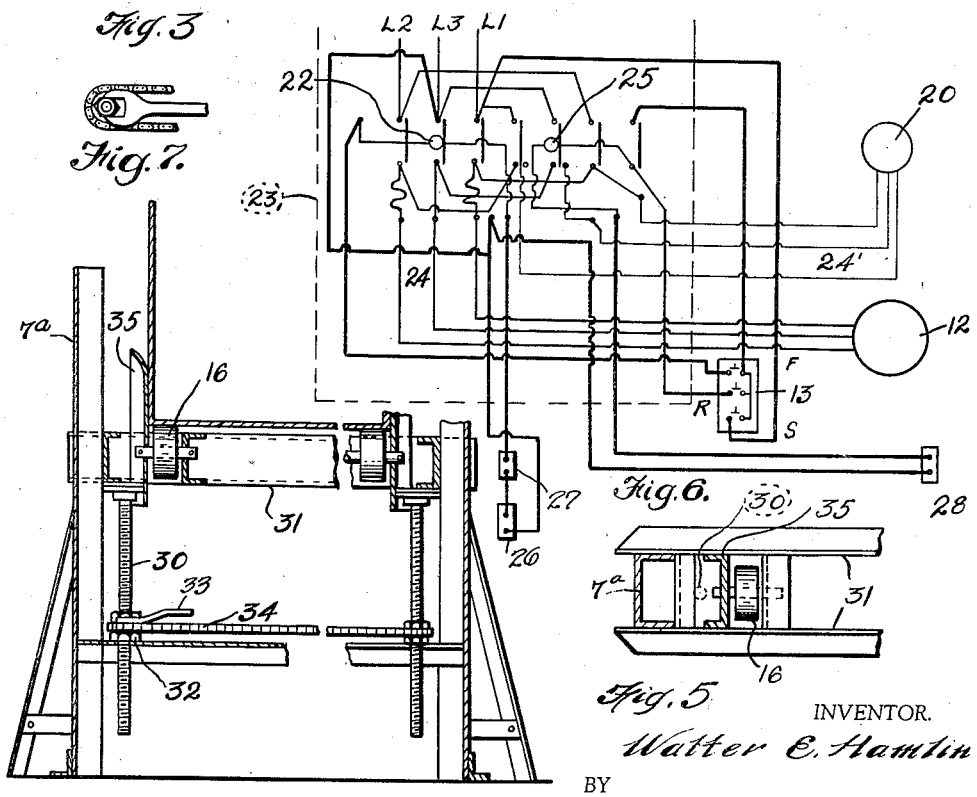

Patented Feb. 8, 1938

2,107,569

UNITED STATES PATENT OFFICE 2,107,569

LOADING DEVICE

Walter E. Hamlin, Cleveland, Ohio, assignor, by mesne assignments, to Consolidated Iron-Steel Manufacturing Company of 1932, Cleveland, Ohio, a corporation of Ohio Application December 31, 1935, Serial No. 56,926

2 Claims. (Cl. 214—41)

In the loading of freight-carrying trucks, cars, etc., it is customary to stow the load in place piece by piece. This entails a corresponding idle period for the truck at the loading platform and cuts down its time-efficiency, and interposes an unwanted delay in many instances in special delivery schedules. In some situations also, where loading has to be done over a sidewalk or in an alley-way, prolonged blocking of the space at the loading platform is highly objectionable. It has been proposed to prearrange the load in a box, skid or other type of body so that at the time of loading it into a truck, freight car or the like, the load is moved not piece by piece but as a unit into the truck or the like and the skid or body withdrawn leaving the load in the truck. In such cases it is important to be able to adjust the height of the skid or body to suitably engage the bed of the truck or car being loaded since the beds of such trucks are of different heights and by the present invention this is made possible in a manner particularly advantageous.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings:—

Fig. 1 is a side elevational view of an embodiment of the invention applied to a loading device of the type referred to; Fig. 2 is a similar view showing the device in its discharging position; Fig. 3 is a rear elevation, on enlarged scale; Figs. 4 and 5 are vertical and transverse sectional details taken on planes substantially indicated by lines IV and V, respectively, Fig. 1; and Fig. 6 is a wiring diagram of the electric control circuits. Fig. 7 is a fragmentary sectional view taken from the plane 7—7 and showing a nut and wrench arrangement which I may employ.

Referring more particularly to the drawings, there is shown a movable loader body or support 2 which may vary somewhat as to its form, but which is in general a support on which the load may be formed, and which may be open at both ends and provided with sides if desired suitable for assisting in rapid alignment of packages or bundles as stacked into position for the load, and being movable into and out of the vehicle to then be given the load. The bottom of the loader is movable per se in some suitable arrangement so as to allow of its being operated for discharge of the prepared load stacked thereon, and one desirable form of construction for such a movable bottom is a roller or endless belt arrangement, a single belt 4 of width sufficient to extend from side to side of the loader, or a plurality of spaced belts, the endless belt construction being mounted to run over pulley rollers 6, 5, the former being an idler, and the latter positively driven at controlled times as detailed hereinafter. Intermediate rollers for the belt are provided as necessary. By a suitably small diametered pulley or roller 16, the effective bottom of the loader is not unduly elevated above the floor of the car or truck in which the loader is to operate. The loader 2 as a whole is thus reciprocable, and in its retracted or inner position is adapted to be piled with its load, and in its projected or outer position it is adapted to deposit its load in a freight car or truck. For mounting the loader, a suitable framework is provided which may include posts or uprights 7 with bracing to the extent necessary, and including track rails 9, upon which track wheels 10 supporting the loader may travel. In the particular form shown, the rails are conveniently channel irons. The track wheels 10 are mounted in a bracket under-body portion 11 of the loader and are arranged to be driven through suitable gearing by a motor 12 controlled from the controller box 13 which is positioned at a convenient point at the back end of the loader, accessible from the stepboard 14 of the loader where the operator can stand for the discharge of the device. While the weight may be so compensated and the track wheels so positioned as to support the device in all of its positions, it is generally desirable to have forward support rollers 16 in the supporting under-frame, as adjacent the front post 7a, and also a pair of running-wheels 17, carried at the forward end of the loader, and adapted to ride onto the floor of the car or truck when the loader is in its forward or projected position therein. Depending upon the balancing of the weight apportionment, the wheels 17 need contact with the floor of the car or truck only for a portion of the travel of the loader. The belt bottom 4, as above indicated, is arranged to be driven for smoothly letting down the load on the truck floor at the appropriate time and rate as the loader is withdrawing from the truck to be loaded. For this, the belt bottom is controllably driven at the appropriate time by a suitable drive means, such as a loader drive motor with a throw clutch connection to the belt roller, or a separate drive motor. Preferably a motor 20 for this is carried by the rear end of the loader body, for instance in the under-body 11, and connected through gearing or chain 21 to the drive roller 5 of the floor belt, the controller box 13 having a suitable switch connection also for this motor. The detail construction of the control means may of course vary considerably, and for purpose of illustration it may be taken as including a push button F making contact to supply current from the line L1 through an electro-magnet 22 in a magnetic reversing switch 23 which makes suitable connections with the lines L1, L2, L3 of a three phase supply to the circuit 24 of the motor 12. The push button R controls the flow of line current from line L1 through electro-magnet 25 to move appropriate contactors to connect the lines L1, L2, L3, in reverse order, to the circuit 24 of the motor 12 and at the same time to the circuit 24' of the bottom or belt motor 20. The push button S is arranged to stop both motors, being of the interrupter type, the line current normally flowing through it from line L1. Additionally, a limit switch or interrupter 26 is mounted in its box S1 on the front end of the loader body 2 with its projecting stem or lever positioned to srike the front wall or cab of the truck and thereby cause the switch 22 to go off contact. A limit switch 27 is also advantageously mounted in its box S2 on the stationary frame or post 7a, so that in event of impossibility of proper contact and functioning of the limit switch 26, the bracket under body 11 will in any event throw the front limit switch 27 and prevent the loader body from being over-run. A rear limit switch 28 in its box S3 is also placed on the rear frame or post 7 so as to be struck by the under body 11 on full return to retracted position.

In the operation of the device, with the loader 2 in its retracted position, as shown in Fig. 1, the operators may be served by a suitable feed conveyor which need not be detailed and they can rapidly stack the packages, boxes or bundles to make up the load L in position on the floor 4. For example, a load of newspapers, bundled in bundles, may be quickly set up as a stack on such floor. With the load L all stacked, and an automobile truck T backed into position, as against the stop post P, the operator takes his position on the step board 14 and presses the "forward" button F of the controller 13 to set the motor 12 into operation, thereby causing the track wheels 10 to carry the loader forward into projected position on the floor of the truck. The limit switch 26 on the front of the loader strikes the front or cab-wall of the truck T, and thus through its circuit causes the magnet in the magnetic switch 23 to throw the contactors 24 off and stop the motor 12 and stop the forward movement of the loader body 2. Then, the operator presses the "reverse" button R in the controller box and thereby reverses the motor 12, and at the same time throws into operation the motor 20, which, as the loader body is drawn out of the truck, moves the belt or loader floor 4 in forward direction and consistent rate of speed, such that the stacked load on the bottom 4 is let down onto the truck floor at the rate that the loader is drawn back. Correspondingly, the stacked load is quickly and smoothly deposited as a bunch in the truck, and the loader withdrawn from the truck is in its retracted position ready again to be stacked full. On striking the limit switch 28, the loader is stopped.

While, of course the refinements of the limit switches may be omitted, and the operator control the movements safely if the motors be not over-powered, it will be noticed that by the inclusion of these, the operation is made automatic to the extent that the care of the operator is required only for initiating the steps of operation, and he is thereby relieved from necessity of close watching, and the entire cycle is speeded up.

When the loader is required to serve trucks of differing height, the forward end of the loader may be easily regulated to required height in any instance by a height-control means. One convenient form of this as illustrated, may comprise screw-stems 30 (see Fig. 4) whose upper ends support the member 31 which is forked at its ends and straddles the fixed posts 7a and carries the rollers 16, the screw-stems being operated by nut members 32. Rotation of the nuts in appropriate direction by a tool 33 raises or lowers the forward end of the loader as desired. With a chain and sprocket connection 34 between the nut means 32, turning of one operates both together. At the forward end of the loader support also, guides 35 are carried by the member 31 to insure alinement of the loader body in its movements.

Other modes of applying the principle of the invention may be employed, change being made as regards the details described, provided the features stated in any of the following claims, or the equivalent of such, be employed.

I therefore particularly point out and distinctly claim as my invention:—

1. A load transfer apparatus of the type comprising a main frame and a forwardly and rearwardly movable body adapted to carry a load, a wheel support on the frame for movably supporting the body, the wheel support comprising a frame element extending transversely of the main frame, means to guide the frame element to move vertically on the main frame, a pair of wheels rotatably supported on the frame element disposed under laterally spaced portions of the body, a pair of laterally spaced screws connected at upper end portions to laterally spaced portions of the transverse frame element, a nut on each screw, a frame support under each nut, a sprocket wheel connected to each nut, a sprocket chain connecting the sprocket wheels, a nut having means engageable by a tool to turn it to effect longitudinal propulsion of the screws to raise and lower the transverse frame element and wheels thereon.

2. In a load transfer apparatus of the type comprising a main frame and a forwardly and rearwardly movable body adapted to carry a load, a pair of supporting wheels for the body, vertically movable means at transversely spaced points of the frame for rotatably supporting the wheels, screws connected at upper ends to said wheel supports respectively, nuts on the screws rotatably supported on the frame, a sprocket wheel connected to each nut, sprocket chains connected to the sprocket wheels, a nut having means engageable by a tool to turn it.

WALTER E. HAMLIN.